July 12, 1966     R. R. SERRANO ETAL     3,260,234

DESICCANT TAPE

Filed Dec. 11, 1964

ROGER R. SERRANO
EDWARD E. KELLER
INVENTORS

BY *Carl R. Brown*
ATTORNEYS
*Carl F. Potts*

3,260,234
DESICCANT TAPE
Roger R. Serrano and Edward E. Keller, San Diego, Calif., assignors to General Dynamics Corporation, San Diego, Calif., a corporation of Delaware
Filed Dec. 11, 1964, Ser. No. 417,546
6 Claims. (Cl. 116—114)

The present invention relates to a moisture absorption device.

There are many situations wherein the atmosphere within an enclosed space must be maintained in a highly moisture-free condition. An instrument container for a missile is an example of such a situation. The maintenance of a low relative humidity within the container is absolutely essential to reliable operation of the equipment. At the present time this condition is sought to be established by purging the containers or canisters with highly priced dry nitrogen.

It is an object of the present invention to provide a moisture absorption device which is light-weight and easy to use with containers of vastly different sizes and shapes.

It is another object of the present invention to provide a moisture absorption device which can be installed in small spaces and within complex container wall configurations.

It is a further object of the present invention to provide such a moisture absorption device which is low in cost, and which is reusable after treatment.

Figure 2:
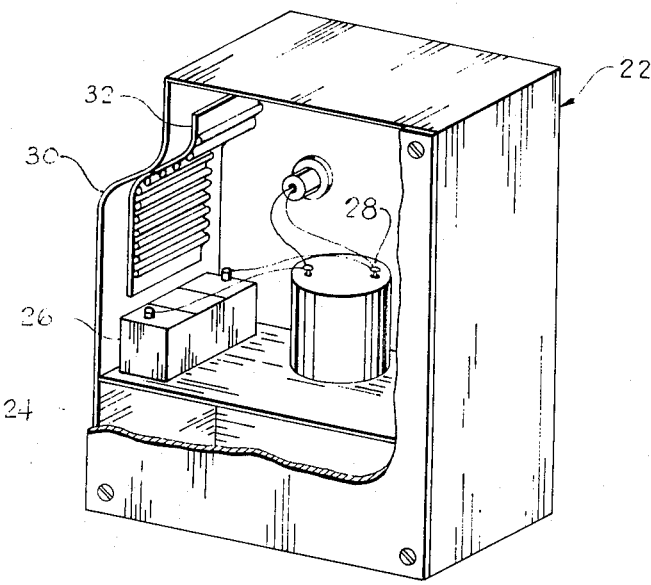
FIGURE 2 is a perspective view of an instrument container utilizing the moisture absorbing device of the present invention. A portion of the front panel of the container is broken away to reveal internal construction.
Figure 1:
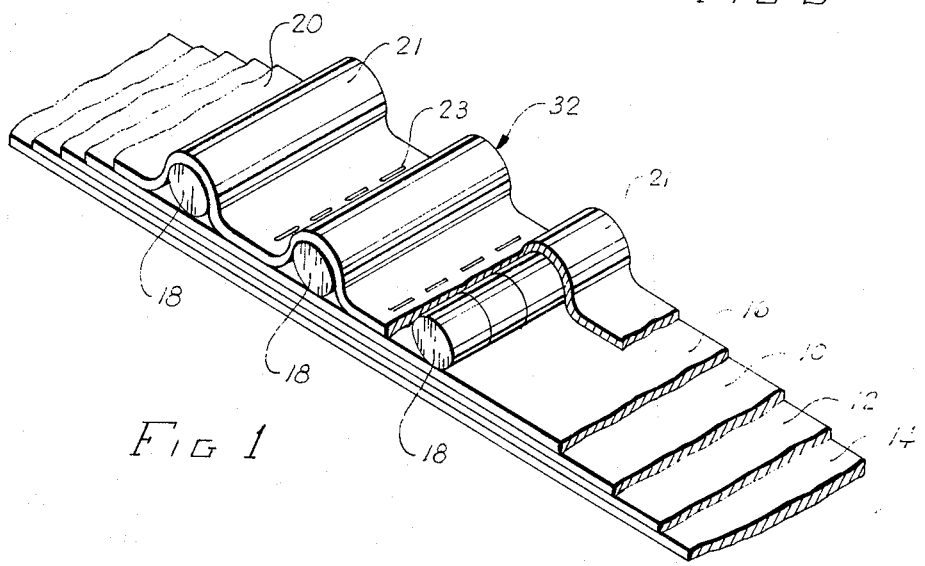
FIGURE 1 is a fragmentary perspective view, with portions broken away, showing the moisture absorption device of the present invention.

The present invention is constructed in the form of a desiccant tape. A supporting strip of flexible, sturdy material such as aluminized Mylar is shown at 10. An adhesive coating or layer 12 is applied to the bottom of supporting strip 10. This bottom adhesive layer is preferably thermoplastic so that it will adhere to a surface upon the application of pressure and remain tacky over a wide range of temperatures. It is formed of natural rubber, synthetic rubber, silicone base material, or the like, with a suitable plasticizer. A protective strip 14 is disposed over the adhesive layer 12 to protect the same. This protective layer is removed from the adhesive layer 12 when the device is used. The protective layer is formed of a material such as Teflon impregnated fiberglass or thin Teflon film.

An upper adhesive layer or strip is indicated at 16. This layer is applied to the upper surface of the supporting strip 10. It is preferably a thermosetting material such as epoxy-nylon, phenolic rubber, polyurethane base material, or the like, forming a stable, flexible condensation product upon curing. A plurality of pellets of desiccant material, such as activated alumina, are positioned on the upper surface of the upper adhesive layer 16. These pellets are formed of a fine powder which is compacted and held together with a binder. This avoids the fine powder sifting away from the tape assembly. One pellet size which has been used is one-eighth inch long and one-eighth inch in diameter. The pellets 18, and the remainder of the adhesive surface 16 are covered with a strip 20 of flexible porous material. This strip may be formed of a porous, fibrous cellulose base paper or membrane, for example. A fine, mesh synthetic fabric such as nylon, or the like, may also be used. The upper strip 20 is crimped closely along the desiccant pellets 18 to closely engage the same and hold them firmly in place on the adhesive layer 16. This forms corrugations 21 in the tape assembly. If desired, stitches 23 of thread, or the like, may be provided through strips 10, 16 and 20 to aid in holding the pellets 18 securely in place. The ends of the corrugations 21 are closed with a solvent base adhesive such as a lacquer to prevent endwise displacement of the pellets.

In use, the protective strip 14 is peeled away from the adhesive layer 12 on the bottom of the supporting strip 10. The remaining assembly or desiccant tape is then moved into the desired location and pressed into place with the adhesive layer 12 against a suitable supporting surface. FIGURE 2 shows an electronic component package including a container 22. A chassis is shown at 24 which includes various electronic components such as those indicated at 26 and 28. The space above the electronic components 26 and 28 is limited, and the sidewall 30 of container 22 is indicated as being of a complex or irregular shape. A strip 32 of the desiccant tape of the present invention is shown fixed in place on the sidewall 30 of the container 22. This demonstrates the versatility of the moisture absorbing device of the present invention. It can be firmly fixed on irregular contours such as possessed by the sidewall 30.

The adhesive layer 12 holds the desiccant tape firmly in position in the container, and the porous outer strip 20 holds the pellets of desiccant material firmly in position on the tape. This arrangement will withstand shock and vibration such as caused by a missile launch, for example. The porous outer strip 20 allows moisture to reach the desiccant pellets 18. The desiccant removes residual or generated moisture from the atmosphere within the container.

The desiccant material may be mixed with a moisture indicating material such as cobalt chloride, sulphate, nitrate or acetate, for example. This is a color indicator which will render a suitable indication when the desiccant material is saturated with moisture. The ends of the corrugations 21 formed in the tape 32 are closed with a suitable transparent adhesive so that the color of the desiccant may be observed. When the color of the desiccant indicates that the composite tape has absorbed its limit of moisture, the tape can be stripped off, dried in an oven, and reused.

We claim:
1. A moisture removing device comprising a composite flexible tape, including:
 a supporting strip of flexible strong material;
 a layer of adhesive on the bottom of said supporting strip for affixing said tape to a structure;
 a plurality of pellets of desiccant material fixed in place on top of said supporting strip;
 a strip of strong flexible, porous material positioned closely over said pellets and fixed to said supporting strip to form corrugations and hold said pellets to said supporting strip; and
 closure means along the ends of said corrugations.

2. A device according to claim 1 wherein the desiccant material includes a color indicator to indicate the moisture content of said desiccant material, said composite tape being capable of reactivation when it has absorbed a selected amount of moisture.

3. A device according to claim 1 wherein a protective strip is positioned over said adhesive layer when the composite tape is not in use.

4. A moisture removing device comprising a composite flexible tape, including:
 a supporting strip of flexible strong material;
 a layer of adhesive on the bottom of said supporting strip for affixing said strip to a structure;

a layer of adhesive on the top of said supporting strip;

a plurality of pellets of desiccant material fixed in place on top of said supporting strip and held thereto by said top layer of adhesive;

a cover strip of strong, flexible, porous material positioned on said layer of thermosetting adhesive to closely hold said pellets in engagement with said thermosetting adhesive, said outer strip forming corrugations in said tape over the pellets; and closure means at the ends of said corrugations.

5. A device according to claim 4 wherein the supporting strip and cover strip are mechanically joined between said corrugations.

6. A device according to claim 4 wherein the desiccant material includes a color indicator to indicate the moisture content of said desiccant material;

and wherein the ends of the corrugations are closed with a transparent material so that the color of the desiccant may be observed.

No references cited.

LOUIS J. CAPOZI, *Primary Examiner.*